United States Patent
Han

(10) Patent No.: US 10,884,098 B2
(45) Date of Patent: Jan. 5, 2021

(54) RADIO MAP CONSTRUCTION METHOD

(71) Applicant: KOREA ADVANCED INSTITUTE OF SCIENCE AND TECHNOLOGY, Daejeon (KR)

(72) Inventor: Dongsoo Han, Daejeon (KR)

(73) Assignee: Korea Advanced Institute of Science and Technology, Daejeon (KR)

(*) Notice: Subject to any disclaimer, the term of this patent is extended or adjusted under 35 U.S.C. 154(b) by 0 days.

(21) Appl. No.: 16/479,259

(22) PCT Filed: Jan. 23, 2018

(86) PCT No.: PCT/KR2018/000984
§ 371 (c)(1),
(2) Date: Jul. 19, 2019

(87) PCT Pub. No.: WO2018/135923
PCT Pub. Date: Jul. 26, 2018

(65) Prior Publication Data
US 2019/0383896 A1    Dec. 19, 2019

(30) Foreign Application Priority Data

Jan. 23, 2017  (KR) .................. 10-2017-0010217
Jan. 17, 2018  (KR) .................. 10-2018-0005895

(51) Int. Cl.
*G01S 5/02*      (2010.01)
*H04W 4/33*     (2018.01)
(Continued)

(52) U.S. Cl.
CPC ............. *G01S 5/02* (2013.01); *H04W 4/025* (2013.01); *H04W 4/33* (2018.02); *H04W 64/003* (2013.01); *H04W 84/12* (2013.01)

(58) Field of Classification Search
CPC ................................ H04W 64/00; H04W 4/02
See application file for complete search history.

(56) References Cited

U.S. PATENT DOCUMENTS

2014/0011518 A1    1/2014  Valaee et al.
2016/0150380 A1    5/2016  Han et al.
(Continued)

FOREIGN PATENT DOCUMENTS

KR    10-2013-0067411 A    6/2013
KR    10-2015-0035745 A    4/2015
(Continued)

OTHER PUBLICATIONS

Krishna Chintalapudi et al., "Indoor Localization Without the Pain", Proceeding MobiCom, 10 Proceedings of the sixteenth annual international conference on Mobile computing and networking, Sep. 20-24, 2010, pp. 173-184, URL:https://dl.acm.org/citation.cfm?Id=1860016.

*Primary Examiner* — Charles N Appiah
*Assistant Examiner* — Frank E Donado
(74) *Attorney, Agent, or Firm* — Rabin & Berdo, P.C.

(57) ABSTRACT

According to the present invention, a radio map construction method uses a genetic algorithm and comprises the steps of: (a) generating a plurality of chromosomes, each including a set of pairs consisting of a fingerprint labeled with an address and a position selected within a region s of the address; (b) generating a temporary radio map by using the pairs of the chromosomes; (c) arranging collected fingerprint sequences by using the temporary radio map; and (d) evaluating the placement of the fingerprint sequences.

12 Claims, 5 Drawing Sheets

(51) Int. Cl.
*H04W 64/00* (2009.01)
*H04W 84/12* (2009.01)
*H04W 4/02* (2018.01)

(56) References Cited

U.S. PATENT DOCUMENTS

2016/0249167 A1* 8/2016 Jagannath ............... H04W 4/33
2016/0371394 A1* 12/2016 Shahidi ................. G01S 5/0252
2018/0098196 A1* 4/2018 Dal Santo ............... H04L 67/02
2018/0302751 A1* 10/2018 Coutinho ............. G01S 5/0036

FOREIGN PATENT DOCUMENTS

KR  10-1625757 B1  5/2016
KR  10-1640184 B1  7/2016

* cited by examiner

RADIO MAP CONSTRUCTION METHOD

TECHNICAL FIELD

The present invention relates to a radio map construction method and, more particularly, to a radio map construction method which enables collecting fingerprints capable of mapping an address and constructing a radio map necessary for accurate indoor location service by using the same.

BACKGROUND ART

Crowd sourcing techniques for collecting Wi-Fi fingerprints from arbitrary devices have been actively used to construct a radio map necessary for a Wi-Fi positioning system. In addition, various machine learning techniques have recently been used to label the locations of cloud-sourced fingerprints from unspecified machines.

In particular, various attempts have been made to automatically construct a radio map using a semi-supervised learning technique and an unsupervised learning technique.

However, an example of actually utilizing the cloud-sourced fingerprints when constructing the radio maps is extremely rare. This is because there is no practical way to label the cloud-sourced fingerprints.

There is a method of manually collecting the AP location and/or location-labeled fingerprints and using the same as a location reference of the location-labeling machine learning technique. However, the collecting of the location reference is the biggest obstacle to the widespread use of location-labeling machine learning techniques.

When the cloud-sourced fingerprints are automatically labeled, it is possible to automatically construct the radio maps on a per building basis, on a per city basis, on a per country basis, and even on global area, which results that Indian language (indoor) location service for the global area ultimately becomes possible.

For example, an indoor location service on a per-city basis can provide location services for users which are in each building within a city, which results in providing various advantages such as improving the lives of the city people. The indoor location services on a per city basis can be associated to or combined with outdoor location services, whereby it is possible to provide more effective location services in the fields of police, fire protection, rescue, and the like. The city radio map should model the WiFi signal pattern for each location at each building in the city. Although urban radio maps can be manually constructed, the urban radio maps are impossible to construct because the much manpower and time are required.

DISCLOSURE

Technical Problem

The present invention has been made to solve the above-mentioned problems, and an objective of the present invention is to provide a radio map construction method that enables automatic construct of a radio map by utilizing a cloud-sourced fingerprint.

The present invention has an objective to provide a radio map construction method that enables collection of fingerprints mapped to addresses by utilizing a specific application and constructs a radio map from address-fingerprints collected according to the classified geographic types.

The present invention has an objective of providing a method of constructing a radio map from address-fingerprint and fingerprint sequences collected using a semi-supervised learning technique.

It is another object of the present invention to provide a radio map construction method that enables a best fingerprint to be mapped, using a cloud-sourced fingerprint, to each location where a radio map will be constructed by utilizing a genetic algorithm.

It is to be understood that the technical objectives to be obtained by the present invention are not limited to the technical objectives mentioned above and other technical objectives not mentioned will be obvious to one of ordinary skill in the art from the description below.

Technical Solution

A radio map construction method according to an embodiment of the present invention includes: (a) generating a plurality of chromosomes, each including a set of pairs consisting of fingerprints labeled with addresses and locations selected within regions of the addresses; (b) generating a temporary radio map by using the pairs of the chromosomes; (c) performing placement of fingerprint sequences collected by using the temporary radio map; and (d) evaluating the placement of the fingerprint sequences.

In the radio map construction method, when at least the step (a) is performed at first to configure a first generation, the selected locations may be randomly selected within a region of the corresponding address; and the steps (b) to (d) may be performed sequentially on each of a plurality of chromosomes.

In the radio map construction method, the step (d) may evaluate the placement of the fingerprint sequence on the basis of the temporary radio map generated by using a loss function reflecting a mobility of a user in the fingerprint sequence.

In the radio map construction method, the radio map construction method may include: filtering a portion of the plurality of chromosomes according to a result of the evaluation in the step (d) to configure the next generation including the filtered portion of the chromosomes and new chromosomes; and repeatedly performing the steps (b) to (d).

The radio map construction method may further includes modeling an internal structure of a building, in which the radio map is to be constructed, by the topology according to a hidden Markov model (HMM) before the step (a), wherein the topology represents each location in the building as a state and a geographic accessibility between locations as a transition.

In the radio map construction method, the temporary radio map may be generated through a process of generating a fingerprint corresponding to each location in the building using the set of pairs and through an interpolation technique.

In the radio map construction method, the radio map construction method may include terminating the repetitive performance of the steps (b) to (d) through generation evolution when no more gain exists as a result of the evaluation using the loss function as compared with the previous generation.

The radio map construction method, before the step (a), may further include: collecting fingerprints corresponding to a specified address through a designated application; and classifying the address-labeled fingerprints via the collecting according to addresses, wherein the designated application is a payment application or a resource usage metering application.

In the radio map construction method, the steps (a) to (d) may be performed on fingerprints of addresses classified as a commercial area.

In the radio map construction method, when the classified address is a residential area, a radio map of the residential area may be further constructed through an interpolation technique for the fingerprints corresponding to the address of the residential area.

The radio map construction method may further include clustering the fingerprints collected in correspondence with the designated address into a plurality of groups and determining a fingerprint to be labeled with the address using the fingerprints of the clustered group.

The radio map construction method may further include collecting a fingerprint sequence including fingerprints and a series of collection times using the designated application before the step (a).

In the radio map construction method, the collecting of the fingerprints corresponding to the designated address may include correcting fingerprints including pairs of signal strengths and one or more wireless AP identifiers collected by the designated application for a predetermined time before, after, or before and after an occurrence time of a transaction through the designated application.

A radio map construction method performed by a radio map construction apparatus according to an aspect of the present invention includes: collecting and accumulating fingerprints labeled with addresses through cloud sourcing; and determining an optimal location within a region of a corresponding address for each of the fingerprints labeled with the addresses using a genetic algorithm In the radio map construction method, a set of pairs consisting of the fingerprints labeled with the addresses and the selected locations within the regions of the addresses may be used as chromosomes in the genetic algorithm.

The radio map construction method may further include collecting unlabeled fingerprint sequences, performing placement of the collected fingerprint sequences on the basis of a temporary radio map corresponding to the chromosomes, and evaluating the placement.

In the radio map construction method, using a result of the evaluation, chromosomes to be used in the next generation may be determined and whether or not to terminate the evolution may be determined.

Advantageous Effects

The radio map construction method according to the present invention has an effect that enables automatic construct of a radio map by utilizing a cloud-sourced fingerprint.

In addition, the radio map construction method according to the present invention has an effect that provides a radio map construction method that enables collection of fingerprints labeled with addresses by utilizing a specific application and constructs a radio map of any area from address-fingerprints collected according to the classified geographic types.

In addition, the radio map construction method according to the present invention has an effect that enables mapping of the fingerprints to the accurate locations by using a semi-supervised learning technique that uses the collected address-fingerprints and the location-unlabeled fingerprints.

In addition, the radio map construction method according to the present invention has an effect of automatically and rapidly constructing a radio map from cloud-sourced fingerprints using a genetic algorithm that evolves into multiple generations.

It is to be understood that the effects that are attainable by the present invention are not limited to the effects mentioned above and other effects not mentioned will be obvious to one of ordinary skill in the art from the description below.

BEST MODE

The above and other objects, features and advantages of the present invention will become more apparent from the following detailed description of the present invention when taken in conjunction with the accompanying drawings, and accordingly those skilled in the art to which the present invention belongs may easily implement the technical idea of the present invention. In addition, in the following description, well-known functions or constructions are not described in detail since they would obscure the invention in unnecessary detail. Hereinafter, preferred embodiments of the present invention will be described in detail with reference to the accompanying drawings.

Figure 1:
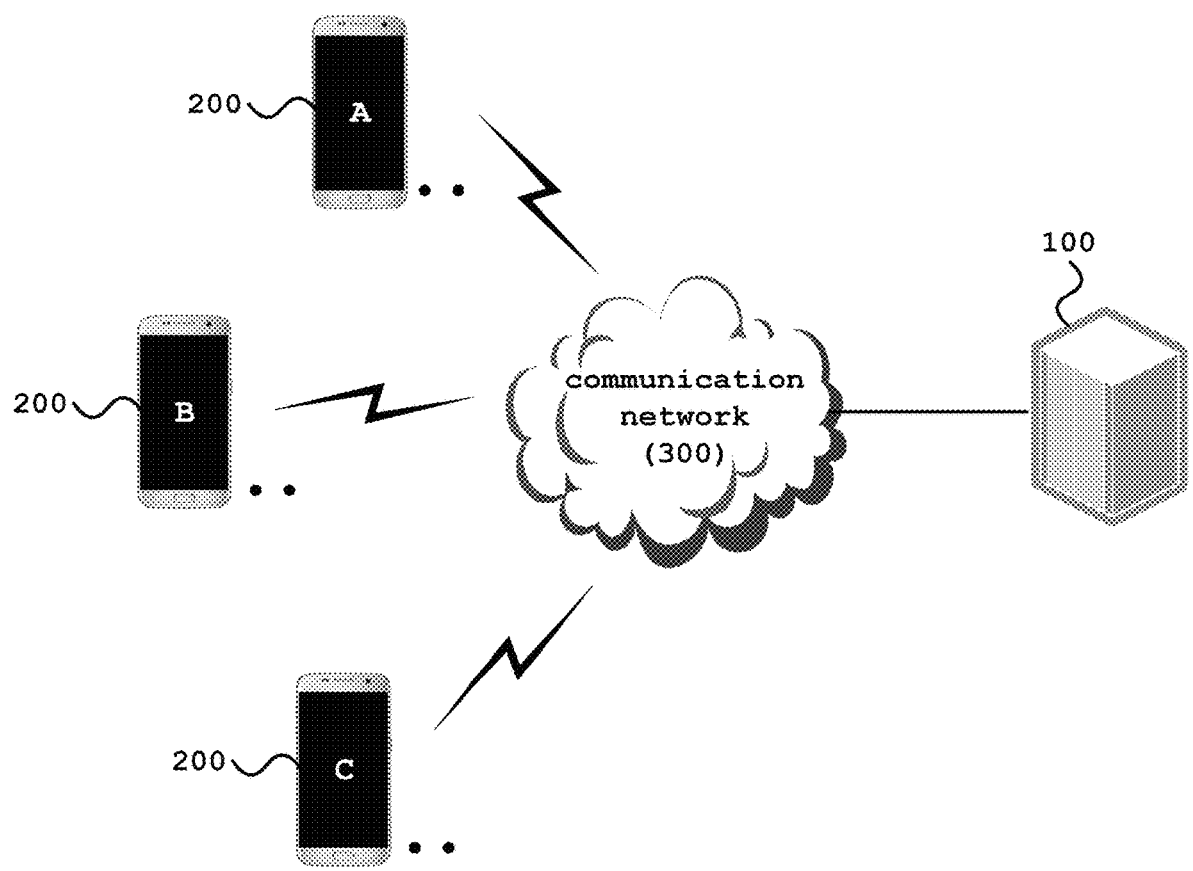
FIG. 1 is a diagram showing an example of a connection configuration between apparatuses configured in a radio map construction system.

FIG. 1 is a diagram illustrating an example of a connection configuration between apparatuses configured in a radio map construction system.

As shown in FIG. 1, a radio map construction system according to the present invention includes a radio map construction apparatus 100, one or more portable terminals 200, and a communication network 300.

Considering components of FIG. 1, the radio map construction apparatus 100 is an apparatus for constructing a radio map by using fingerprints collected through cloud sourcing. The radio map construction apparatus 100 collects the fingerprints by utilizing one or more portable terminals 200 and maps the collected fingerprints to corresponding addresses acquired in connection with transactions performed by the portable terminal 200, thereby labeling the collected fingerprints as addresses.

The radio map construction apparatus 100 constructs the radio map capable of being used in an apartment, a building, a city, a country, and the like by using the fingerprint labeled with an address and provides the constructed radio map to a portable terminal 200, another device (server), or the like. The radio map construction apparatus 100 will be described in detail with reference to FIG. 2.

The portable terminal 200 is a terminal capable of being carried and used by a user. The portable terminal 200 may be a smart phone, a tablet PC, a notebook, a dedicated portable device, and the like.

The portable terminal 200 includes at least a processor (e.g., an application processor), a storage medium (e.g., a nonvolatile memory, a hard disk), and a communication interface (not shown) configured to transmit and receive wireless signals of a wireless packet through the communication network 300. The communication interface includes at least one communication chip set, an antenna, and the like for connecting to a wireless communication network such as Wi-Fi and/or a mobile communication network.

The portable terminal 200 stores various programs in a storage medium (for example, a non-volatile memory). For example, the portable terminal 200 stores on a storage medium a mobile application that is capable of being executed by a processor to perform various specified functions.

The mobile app used in the present invention is configured to collect fingerprints that may be labeled with addresses. For example, a payment application or the like of the portable terminal 200 collects wireless LAN fingerprints for a predetermined time (e.g., one minute) before, after, or before and after a payment transaction. Alternatively, a usage metering application, which is configured to read an electric meter, a gas meter, a water meter, etc. and transmit the reading of the meter, collects a wireless LAN fingerprint for a predetermined time before, after, or before and after reading the meter.

The collected Wi-Fi fingerprint includes an identifier (for example, SSID, BSSID, etc.) of a wireless AP capable of connection or recognition and a signal strength of a wireless signal from the wireless AP. The portable terminal 200 collects one or more pairs of wireless AP identifiers and signal strengths and transmits the same to the radio map construction apparatus 100 through the communication network 300 during the performance of a designated function (billing, meter reading, etc.).

Such a type of mobile application matches the collected fingerprints to addresses. For example, fingerprints collected at the time of payment using a credit card through a payment application may be matched to those collected at the point (store, restaurant, etc.) where the payment is performed. The fingerprints collected during the meter reading by a meter reader of electric meter or gas meter may be matched to the address (apartment, single house, villa, store, restaurant, etc.) where the meter reading was performed.

In the case of an apartment, the "address" includes information capable of distinguishing each home, and in the case of a building, the "address" includes information that may distinguish each shop. For example, the address is provided to include a building serial No. and a flat No. in the case of an apartment complex, and the number of floors and a room No. in the case of a commercial building.

In addition to payment application or metering application, mobile applications with other functionality may be used to map addresses to fingerprints. When a transaction occurs through such a mobile application, the corresponding address must be specified or extracted. For example, an address of a card merchant at which payment has been made may be specified or extracted using a payment server or the like, and an address at which meter reading has been performed can be specified or extracted using a meter reading server or the like.

Meanwhile, the portable terminal 200 collects fingerprint sequences through a mobile application such as payment application or metering application, or through other types of mobile application. For example, the portable terminal 200 collects fingerprint sequences including a series of fingerprints in a building using any application that is frequently used in the room and transmits the same to the radio map construction apparatus 100.

The fingerprint sequence includes multiple pairs of wireless AP identifiers and signal strengths and multiple collection times, and the radio map construction apparatus 100 uses such a fingerprint sequence for the radio map construction method.

In this way, the portable terminal 200 collects fingerprints to be used to construct the radio map and transmits the same to the radio map construction apparatus 100. The fingerprints to be used to construct the radio map may be collected through applications that are used by normal users over a wide range of geographic areas. As a result, it is possible to construct the radio map for indoor location service more realistically through fingerprint cloud sourcing.

The communication network 300 connects the radio map construction apparatus 100, an arbitrary server, and/or the portable terminal 200 to each other and provides various data transmission/reception paths. The communication network 300 includes a mobile communication network and/or an Internet network provided by a mobile communication service provider. The portable terminal 200 may be connected to the communication network 300 through a wireless AP or the like or even without going through a wireless AP or the like to enable data communication with the radio map construction apparatus 100 and/or any server.

Figure 2:
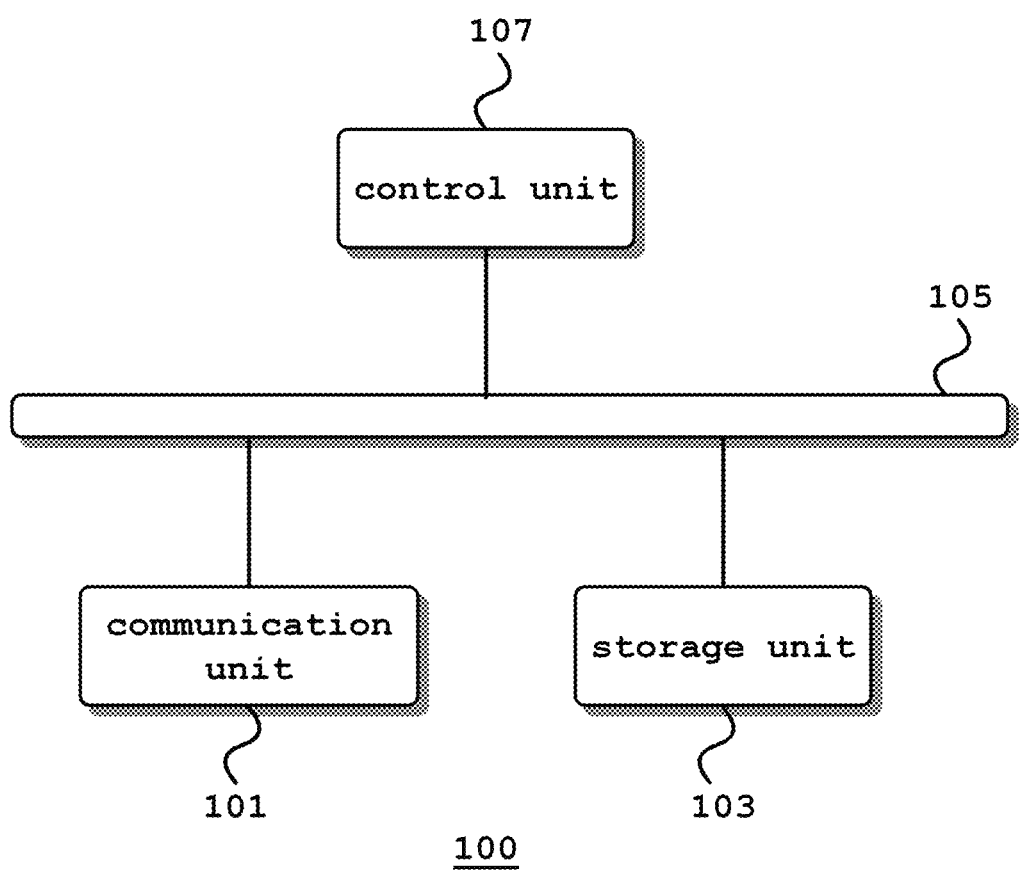
FIG. 2 is a block diagram illustrating an example of a radio map construction apparatus.

FIG. 2 is a block diagram illustrating an example of a radio map construction apparatus.

As shown in FIG. 2, the radio map construction apparatus 100 includes a communication unit 101, a storage unit 103, a connection unit 105, and a control unit 107. FIG. 2 shows a functional block diagram, and each functional block has a corresponding hardware block. The radio map construction apparatus 100 of FIG. 2 may be configured using a variety of hardware. For example, the radio map construction apparatus 100 may be configured with one or more PCs, workstations, and/or mainframes. Other blocks not shown in FIG. 2 may be further included in this block diagram according to a change in the design thereof.

The radio map construction apparatus 100 may perform not only the radio map construction but also other functions. For example, the radio map construction apparatus 100 may further function as a location server that provides location services by utilizing the radio map or a server for an application (payment application, metering application, etc.). According to the design example, such a location server or application server may be configured separately from the radio map construction apparatus 100 (server).

Considering the radio map construction apparatus 100 referring to FIG. 2, the communication unit 101 is an interface for transmitting and receiving data to and from the communication network 300. The communication unit 101 is configured to transmit and receive data to and from the portable terminal 200 and any other server.

For example, the communication unit 101 may receive the fingerprints collected by the portable terminal 200 via the communication network 300 and transmit all or part of the constructed radio map, data indicating location information estimated from the fingerprint, and the like to the portable terminal 200 or the like.

The storage unit 103 stores a variety of data. The storage unit 103 includes a large-capacity storage medium such as a volatile memory, a non-volatile memory, and/or a hard disk, in order to store a variety of data, program executed in the control unit 107, or the like.

The storage unit 103 stores various fingerprints to be used for constructing the radio map. For example, the storage unit 103 stores fingerprints capable of being collected via a payment application or a metering application and mapped to an address. The fingerprints collected at one address may be different from each other. For example, multiple fingerprints with different wireless AP identifiers or signal strengths for the same address are collected through a payment application or a metering application.

The storage unit 103 also stores fingerprints that are not labeled with addresses. For example, the storage unit 103 may store fingerprint sequences collected via a navigation application or a schedule management application, in addition to the payment application and the metering application. These fingerprint sequences include fingerprints collected at each of a series of times within a particular area. The corresponding area may be extracted or recognized from a navigation application or a schedule management application.

The storage unit 103 also stores various DBs. For example, the storage unit 103 stores an address-labeling fingerprint DB that includes fingerprints labeled with an address, and stores a radio map DB constructed for a particular building, area, city, and the like.

The address-labeling fingerprint DB is configured with a plurality of fingerprint items, each of the fingerprint items storing an address (identifier) that collects a fingerprint and the fingerprint corresponding to this address (identifier), and herein multiple fingerprints may be corrected in correspondence to one address.

The radio map DB is configured with a plurality of radio map items, each of the radio map items storing a "location" and a fingerprint corresponding to the location. In each item of the radio map DB, the "location" rather than an "address" is mapped to the fingerprint, and herein, the "location" indicates an exact physical location in the building, which is specified by, for example, an identifier indicating the number of floors of the building and a two-dimensional coordinate in the floor. The construction of the address-labeling fingerprint DB and radio map DB will be described later in detail with reference to FIG. 3.

The connection unit 105 transmits and receives data between blocks in the radio map construction apparatus 100. The connection unit 105 is configured with a local area network, a parallel bus, a serial bus, and the like.

The control unit 107 includes at least one execution unit to load the program stored in the storage unit 103, and executes the instruction code of the program through the execution unit to control the radio map construction apparatus 100.

For example, the control unit 107 collects a fingerprint mapped to a specific address in association with the portable terminal 200 connected to the communication network 300, and constructs or updates the address-labeling fingerprint DB using the fingerprints mapped to the address when sufficient fingerprints are stored for each address or at an arbitrary address.

In addition, when the address-labeling fingerprint DB is constructed and sufficient fingerprint sequences (which may be fingerprints that are not labeled with addresses) are collected, the control unit 107 constructs the radio map DB using the address-labeling fingerprint DB and the fingerprint sequences.

The control unit 107 provides all or part of the constructed radio map DB to another server or portable terminal 200 or makes the same directly available for various location services (route guidance, indoor route guidance, etc.). Various control flows performed by the control unit 107 for constructing DB will be described in detail with reference to FIG. 3.

Figure 3:
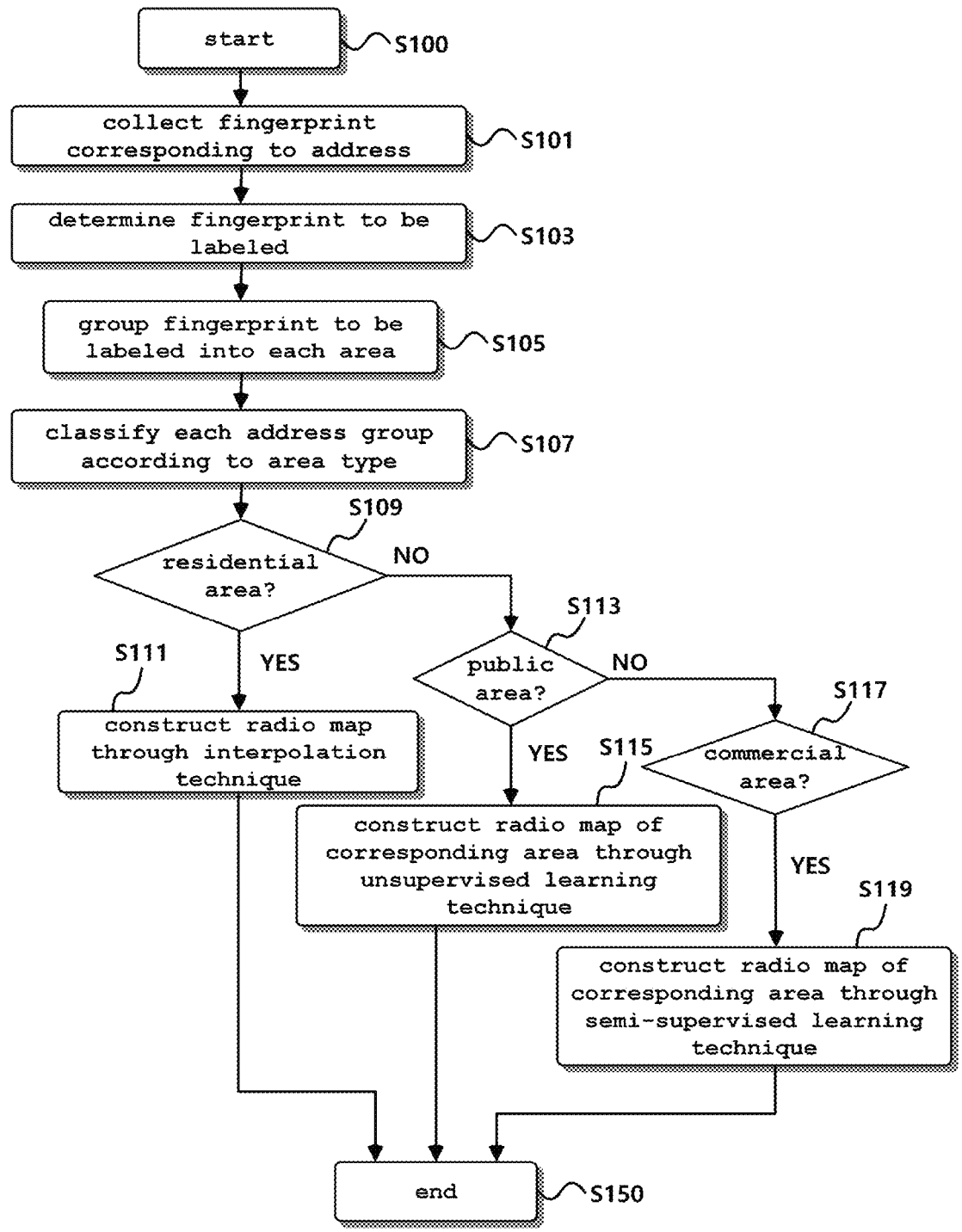
FIG. 3 is a diagram illustrating an example of a representative flow for constructing a radio map.

FIG. 3 is a diagram illustrating an example of a representative flow for constructing a radio map.

The radio map construction method of FIG. 3 is performed by the radio map construction apparatus 100, and preferably the control unit 107 of the radio map construction apparatus 100 loads the program of the storage unit 103 and constructs the radio map in cooperative with any portable terminals 200.

First, as the radio map construction apparatus 100 starts to be operated or executed according to program (S100), the radio map construction apparatus 100 collects fingerprints corresponding to a designated address through a specific application (for example, a payment application, a resource usage metering application) of a portable terminal 200.

For example, the portable terminal 200 collects wireless LAN (Wi-Fi) fingerprints through a Wi-Fi interface for a predetermined time (for example, 30 seconds, 1 minute, 2 minutes, etc.) before, after, or before and after the occurrence time of a payment transaction through a payment application or a (accumulated) usage metering transaction through a metering application. The fingerprint includes one or more pairs of wireless AP identifiers and signal strengths obtained by measuring the wireless signal output from the wireless AP by the portable terminal 200. The transaction may be considered as a functional unit for completing a specific function with a server (a payment server or a metering server). In the transaction, the portable terminal 200 and the metering server may transmit and receive various communication packets.

Thus, the portable terminal 200 collects the wireless LAN fingerprints for a predetermined time before, after, or before and after the transaction, and the collected wireless LAN fingerprints are transmitted to the radio map construction apparatus 100 via the server or directly through the communication network 300. Herein, address information corresponding to the collected wireless LAN fingerprint may be provided together, or address information corresponding to the wireless LAN fingerprint may be provided from a subject providing the corresponding service. The address information may represent the address itself or a combination of characters, numbers, etc. (for example, a merchant number) capable of identifying the address. The address information may specify at least the location where the transaction (payment or resource usage measurement) occurs. The radio map construction apparatus 100 collects and temporarily stores one or more (preferably a plurality of) wireless LAN fingerprints corresponding to each address (identifier).

Thereafter, the radio map construction apparatus 100 determines a fingerprint to be labeled with each address using the temporarily stored fingerprint for each address (S 103). The determination process of the fingerprint to be labeled with the address may be performed, for example, when the number of fingerprints collected for each address exceeds the set number or the collection period is exceeded.

Multiple fingerprints may be collected for a single address. The radio map construction apparatus 100 clusters fingerprints collected in correspondence with the designated address into a plurality of groups and determines the fingerprint to be labeled with the designated address using the fingerprints of each clustered group. Specifically, the radio map construction apparatus 100 clusters a plurality of fingerprints collected in correspondence with a single address according to the degree of similarity between fingerprints and determines the fingerprints to be labeled with the addresses using fingerprints of a group having the largest number among the clustered groups. According to an embodiment, the fingerprints to be labeled may be configured with a pair of a common wireless AP identifier and a signal strength value according an average value of signal strengths corresponding to the common AP identifier or the probability.

The radio map construction apparatus 100 is configured with a fingerprint to be labeled with an address (identifier) as a fingerprint item to store the same in an address-labeling fingerprint DB.

Thereafter, the radio map construction apparatus 100 classifies the address-labeled fingerprints according to addresses. Specifically, the radio map construction apparatus 100 groups the fingerprints labeled with respective addresses into each area (S105). For example, the radio map construction apparatus 100 groups the addresses of the same or adjacent locations into, for example, a building name, a local name, or a local unit to which each address belongs. The group includes a plurality of fingerprints labeled with addresses (i.e., including a plurality of fingerprints each corresponding to a group of addresses), in which each fingerprint is considered a fingerprint collected at the corresponding address.

The radio map construction apparatus 100 classifies each address group according to the area type of the address group (S107). For example, the radio map construction apparatus 100 classifies the address groups into a residential area, a public area, or a commercial area.

Thereafter, the radio map construction apparatus 100 constructs a radio map according to the classification type for each address group.

For each address group, the radio map construction apparatus 100 determines whether the address group is classified as a residential area (S109). When it is determined to be the residential area, the radio map is constructed for this residential area by using the interpolation technique for the fingerprints of the address group corresponding to the address of the residential area (S111).

A metering reader using the metering application visits each home and measures the energy usage. It is common that homes are spaced apart from each other by a certain distance (for example, an apartment or a single house in a residential district), so that fingerprints collected via the metering application are set as the center of the corresponding address, and fingerprint of the address in which fingerprints are not collected are calculated using known interpolation techniques to construct the radio map of the residential area.

The radio map construction apparatus 100 determines whether the corresponding address group is a public area (S113), and constructs a radio map of the corresponding area through an unsupervised learning technique when it is determined to be the public address (S115).

In the case of the public area, there is a limitation in collecting fingerprints capable of identifying an address through a payment application or a metering application because there are not many energy consumption division points or shops where the payment is made. Thus, it may be preferable to construct the radio map via, for example, the unsupervised learning technique.

The radio map construction apparatus 100 determines whether the corresponding address group is a commercial area (S117). When it is determined to be the commercial area, the radio map is constructed for the commercial area via the semi-supervised learning technique according to the present invention (S119).

The commercial area has many considerations in the construction of the radio map, such as the uncertainty of the fingerprint collection location collected by the payment application, the complexity of the indoor space, and a specific obstacle such as a corridor. In consideration of these various problems, the present invention constructs the radio map capable of precise location guidance through the semi-supervised learning method.

A concrete scheme of constructing the radio map in the commercial area will be described in more detail with reference to FIG. 4. As the construction of the radio map for each area is completed, the flow of FIG. 3 is terminated (S150).

Figure 4:
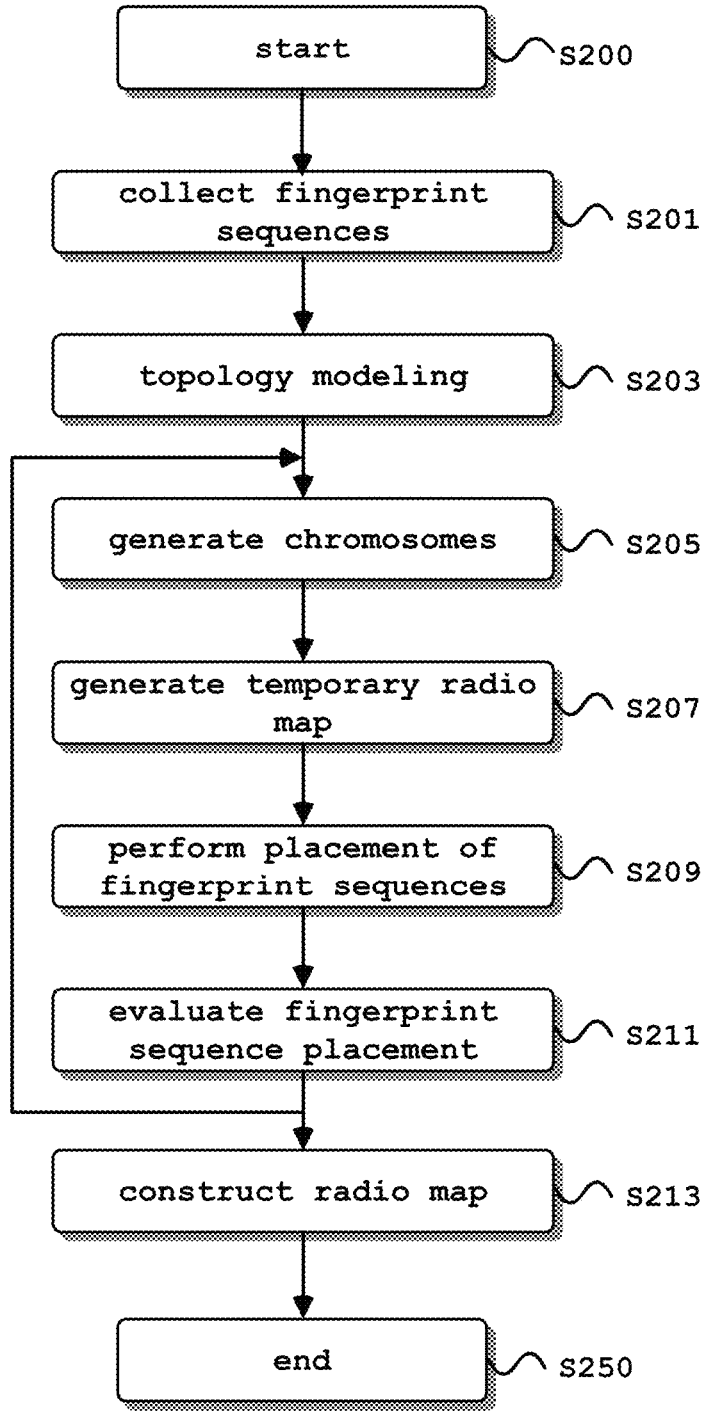
FIG. 4 is a diagram illustrating an example of a detailed flow of radio map construction using address-labeled fingerprints for a commercial area.
Figure 5:
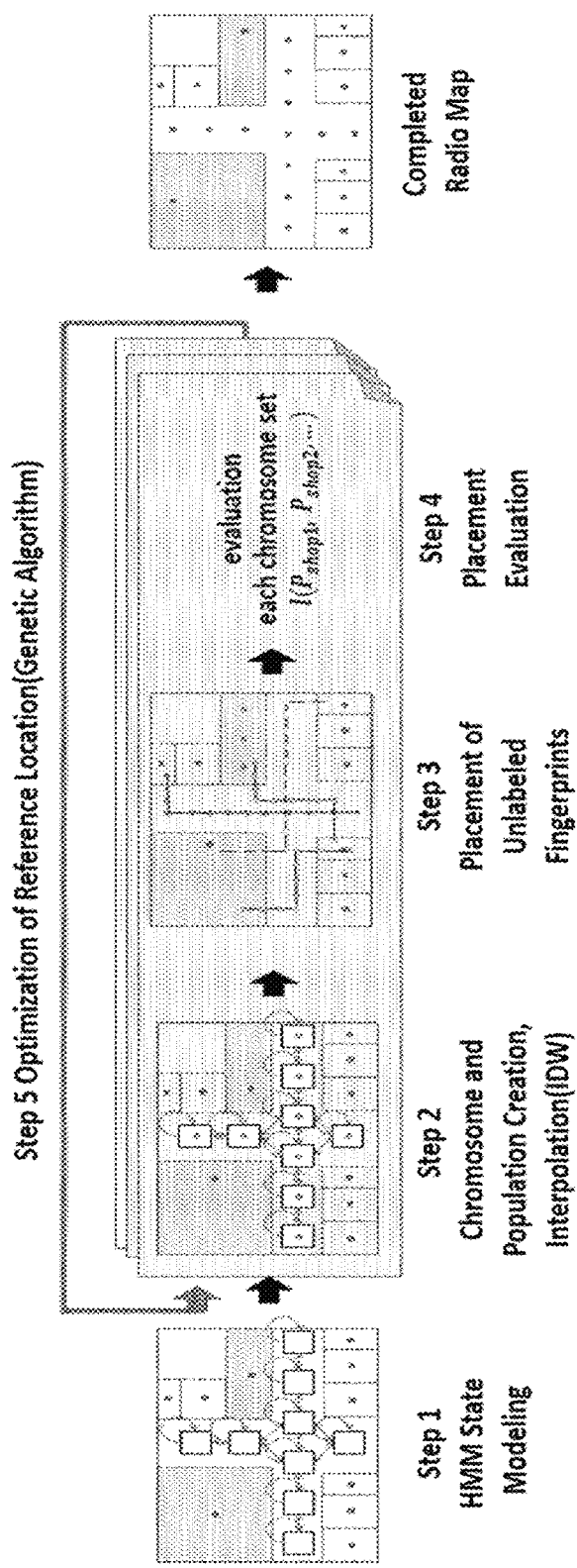
FIG. 5 is a diagram illustrating an example of radio map construction through HMM modeling or the like using fingerprints sourced in a commercial area.

FIG. 4 is a diagram illustrating an example of a detailed flow of radio map construction using address-labeled fingerprints for a commercial area, and FIG. 5 shows an example of an image related to the flow shown in FIG. 4.

The flow of FIG. 4 may be performed by a radio map construction apparatus 100 and preferably performed by a control unit 107 performed by loading program of the storage unit 103.

First, the radio map construction apparatus 100 collects a fingerprint sequence through a designated application of the portable terminal 200 separately or together with the fingerprint used for address-labeling (S201), and transmits the fingerprint sequence to the storage unit 103. This process may be performed together in step S101 of FIG. 3 or performed before or after step S101. The fingerprint sequence includes a series of fingerprints and the times at which each fingerprint is collected.

The fingerprint sequence is collected from the portable terminal 200 of an unspecified user and collected through a designated application. The fingerprint sequence may further include a commercial area identifier indicating the collected area.

The fingerprint sequences collected by the unspecified persons are used to construct the radio map for the commercial area. Multiple fingerprint sequences may be collected for a particular commercial area and these fingerprint sequences are preferably used for evaluation of a temporarily constructed radio map.

As the fingerprint sequence of a particular commercial area is sufficiently secured, or as a specified period elapses, the radio map construction apparatus 100 constructs the radio map for the commercial area.

More specifically, the topology of the corresponding commercial area is first modeled (S203). The radio map construction apparatus 100 generates a topology representing the internal structure (plan view, etc.) of a commercial area (e.g., a building). For example, the radio map construction apparatus 100 is configured such that an internal structure of the commercial area is represented by a topology according to a hidden Markov models (HMM) state modeling (see step 1 of FIG. 5).

The internal structure is transformed into the HMM topology, in which the location is represented by a state and the geographic accessibility between locations within the HMM topology is represented by a transition.

After topology modeling, the radio map construction apparatus 100 is provided to generate chromosomes including a set of pairs of fingerprints labeled with addresses using a genetic algorithm and locations arbitrarily selected within a region of the corresponding address (S205), in which multiple (for example, 100) chromosomes are generated so that, for example, 100 populations are configured (see step 2 of FIG. 5).

Each chromosome has one or more (preferably multiple) pairs of fingerprints labeled with the address of the corresponding commercial area in the address-labeling fingerprint DB for each address and locations selected in the region of the corresponding address. When configuring at least the first generation, the selected location is randomly selected within the area of the address.

The radio map construction apparatus 100 evolves via repetitive performance for each generation by using a genetic algorithm, in which some of the chromosomes of each generation are filtered to be used as chromosomes of the next generation, and the rest chromosomes are newly generated and filled in. Accordingly, in the corresponding chromosomes, even when the location corresponding to the same fingerprint is selected, the location may be different from the location selected in the previous generation.

The address may be generally expressed as a specific region (a range of location region having the form of a square or a rectangle or a region surrounded by a straight line or a curve), and the selected location may be any location within a range of the location region.

The selected location indicates a certain location at which the fingerprint is collected and may be a randomly selected location. The selected locations may be randomly selected to be different from each other for each of chromosomes or generations even for the same address.

In addition, each chromosome includes multiple pairs of fingerprints labeled with addresses and selected locations, in correspondence with the addresses of each shop in a particular commercial area (e.g., a building or a particular floor of building) where the radio map is to be constructed.

Thereafter, the radio map construction apparatus 100 generates a temporary radio map by using the pair of fingerprints and corresponding selection locations for each chromosome generated in one generation (S207).

As a location corresponding to each address (for example, a shop or a restaurant) is selected, the radio map is constructed for regions other than the internal region corresponding to each address. For example, the radio map is also constructed for a corridor outside the shop or restaurant.

The radio map construction apparatus 100 uses the pairs of fingerprints and corresponding selection locations that have been already configured through the generation of a chromosome, thereby constructing the radio map in which the fingerprint is generated for each location of a commercial area in which a fingerprint is required through, for example, an interpolation technique, and the pair of locations and fingerprint is included for each location within the commercial area.

The interpolation technique used for constructing the radio map may be a known technique, for example, an inverse distance weighting (IDW) technique.

Thereafter, the radio map construction apparatus 100 performs placement of the fingerprint sequences collected in the corresponding commercial area (S209). These fingerprint sequences may be fingerprints that are cloud-sourced and not labeled with addresses.

The radio map construction apparatus 100 places the cloud-sourced fingerprint sequence in the radio map generated for each chromosome (see Step 3 in FIG. 5).

All placements for each chromosome are evaluated by the radio map construction apparatus 100 and compared to other placements, to make it possible for the radio map construction apparatus 100 to find the best results within the corresponding chromosome. The algorithm for finding the best result for one chromosome is referred to as a local optimization algorithm hereinafter.

The local optimization algorithm estimates model parameters of the HMM using an Expectation-Maximization (EM) algorithm when an unlabeled fingerprint sequence is given. A likelihood function, $Pr(U,P|\lambda)$ may be used to perform an evaluation on a set of the estimated model parameters and the unlabeled fingerprint sequences. U denotes a set of fingerprint sequences, P denotes placement, and A denotes a set of estimated HMM model parameters.

The product of the appearance probabilities of all the fingerprint placements of the fingerprint sequence is used to evaluate the placement. The similarity of the fingerprint, the mobility of the user, and the structure of the building may be factors that determine the appearance probability. The similarity of the fingerprints may be calculated through well-known techniques (e.g., Euclidean distance or cosine distance), and the mobility of the user and the structure of building may be reflected as the transition of the HMM state.

As such, the radio map construction apparatus 100 may determine the placement optimized through the local optimization algorithm for a single chromosome. When there are 100 chromosomes, the placement based on 100 temporary radio maps is repeatedly performed.

Hereinafter, the radio map construction apparatus 100 evaluates each fingerprint sequence placement based on the temporary radio map corresponding to each chromosome of the generation (S211).

In step S209, the radio map construction apparatus 100 performs local optimization on the basis of each temporary radio map corresponding to each chromosome. In step S211, the placement based on each temporary radio map is evaluated (step 4 of FIG. 5) in order to compare and evaluate each temporary radio map (i.e., each chromosome). When 100 chromosomes are generated in step S205, the relative evaluation is performed on 100 temporary radio maps (chromosomes) in step S211.

There is a need for criteria to select temporary radio maps (chromosomes) to be included in the next generation among entire temporary radio maps (chromosomes). The appearance probability used earlier in the local optimization algorithm of step S209 may be used.

According to the present invention, a loss function that fully reflects the mobility of the user is preferably used to evaluate (the placement of fingerprint sequences based on) the radio map. Consecutively collected fingerprints may be considered to be collected from nearby states. In fact, the probability that two consecutively collected fingerprints are far apart from each other is low and the mobility of the user may be used for evaluation regardless of the number of training samples.

The fingerprint sequence collected according to the present invention includes the collection time of each fingerprint, and the loss function is expressed as:

$$\text{Loss}(p_1, p_2, \ldots, p_m) = \sum_{all\ sequence} \begin{cases} 0, & \text{if } (d_{labelling} < d_{Max}) \\ d_{labelling} - d_{Max}, & \text{otherwise} \end{cases}$$

$d_{labelling}$ = Labeling distance, $d_{Max}$ = Maximum movable distance, $p_i$ = reference location of $i^{th}$ shops The loss function expressed by the above equation is defined to accumulate a penalty $d_{labelling}-d_{Max}$ for a corresponding temporary radio map (chromosome), whenever the labeling distance accompanied with a change from one fingerprint to another fingerprint in placements of the fingerprint sequences is determined to be equal to or greater than the maximum movable distance.

The radio map construction apparatus 100 selects a radio map having the lowest loss function value among the temporary radio maps that are placed to be corresponded to chromosomes of one generation in which the evaluation is performed, as a temporary radio map having the best placement in the current generation.

Thereafter, the radio map construction apparatus 100 configures the next generation through a genetic algorithm, when configuring the next generation according to a result of placement evaluation for each of the plurality of chromosomes. Herein, the next generation may be generated using selection, crossover, and mutation according to the genetic algorithm. The above steps S205 to S211 are repeated for the next generation.

In addition, the radio map construction apparatus 100 compares placement in the current generation with placement in the previous (immediately previous) generation, so that when there is no more gain in the loss function, repetition of the evolution process (S207 to S211) is terminated, and finally the radio map to be used for the actual location service is constructed (S213).

When a gain exists in the placement in the current generation compared to the placement in the previous generation, the radio map construction apparatus 100 generates the chromosomes of the next generation (S205), generates a temporary radio map corresponding to each of the generated chromosomes (S207), places the unlabeled fingerprint sequence in each generated radio map (S209), and then evaluates the corresponding placement (S211).

During evolution, some of the chromosomes of the current generation are filtered out (re-selected) and the rest chromosomes are newly generated to form the entire chromosomes. For example, 30 chromosomes with low loss due to the loss function are selected from among 100 chromosomes, and the rest 70 chromosomes may be newly generated to form a total of 100 chromosomes in the next generation.

The number of generations required for convergence of the genetic algorithm depends on the number of chromosomes, the size of the commercial area (building etc.), the number of HMM states, the number of training samples (unlabeled fingerprint sequences), and the like.

The genetic algorithm according to the present invention utilizes address-labeled fingerprints while treating a broader range of radio mappings, so that it is possible to construct the radio map capable of leading to faster convergence and providing greater accuracy compared to the unsupervised learning technique.

As evolution terminates through evaluation and a particular chromosome is selected, the radio map construction apparatus 100 constructs the radio map for actual location services (S213).

For example, the radio map construction apparatus 100 divides a commercial area in which the radio map is to be constructed into partitions, and calculates the fingerprint mapped to the center location of each partition (e.g., a passageway portion, an address region where the collection is not possible, etc.) that is not mapped by using the selected location and the labelled fingerprint of the finally selected chromosome.

The radio map construction apparatus 100 may further construct the radio map for other commercial areas.

The constructed radio map may be provided to the portable terminal 200 or another server, and the portable terminal 200 or the server may provide the location service to the portable terminal 200 using the provided radio map.

The radio map construction method according to the present invention makes it possible to collect fingerprints capable of being labeled with a specific address through crowd sourcing using a transaction by which address mapping is possible. In addition, the radio map construction method according to the present invention makes it possible to determine an accurate collection location of an address-labeled fingerprint using a genetic algorithm and a fingerprint sequence collected through cloud sourcing, thereby constructing the map.

Accordingly, the radio map according to the present invention may be accurately constructed substantially faster.

As a result of the experiment, it may be confirmed that the radio map constructed according to the present invention is capable of providing an indoor guidance service with higher accuracy than the existing radio map.

Although the accuracy may vary depending on the characteristics of the commercial area, the results of experiments at Lotte World Mall, COEX, and Time Square in Korea show that the accuracy of position estimation is improved by about 30% compared to a case in which the existing radio map is used.

It will be apparent to those skilled in the art that various modifications and variations can be made in the present invention without departing from the spirit or scope of the invention, so that the present invention is not limited to the foregoing embodiments and the accompanying drawings.

What is claimed is:

1. A radio map construction method performed by a radio map construction apparatus, the method comprising:
   modeling an internal structure of a building, in which a radio map is to be constructed, by a topology according to a hidden Markov model (HMM), wherein the topology represents each location in the building as a state and a geographic accessibility between locations as a transition, the modeling including collecting a fingerprint sequence through a designated application of the portable terminal;
   (a) generating a plurality of chromosomes including a set of pairs of fingerprints labeled with addresses of residences within the building and locations selected within regions of the addresses;
   (b) generating a first temporary radio map by using the pairs of the chromosomes;
   (c) performing placement of fingerprint sequences collected by using the first temporary radio map;
   (d) evaluating the placement of the fingerprint sequences by using a loss function to accumulate a penalty for a corresponding temporary radio map, whenever a labeling distance accompanied with a change from one fingerprint to another fingerprint in placements of the fingerprint sequences is determined to be equal to or greater than a maximum movable distance associated with a mobility of a user of the application of the portable terminal; and
   (e) repeating of steps (b) through (d) for at least one other generated temporary radio map and selecting an actual radio map for construction from among the first and at least one other generated temporary radio map based on using the loss function of each of the first and the at least one other generated temporary radio map to determine a radio map having a best placement as the actual radio map.

2. The method of claim 1, wherein when at least the step (a) is performed at first to configure a first generation, the selected locations are randomly selected within a region of a corresponding address; and the steps (b) to (d) are performed sequentially on each of a plurality of chromosomes.

3. The method of claim 2, wherein the step (d) evaluates the placement of the fingerprint sequences on the basis of the first temporary radio map generated by using a loss function reflecting a mobility of a user in the fingerprint sequences.

4. The method of claim 3, wherein the radio map construction method includes:
   filtering a portion of the plurality of chromosomes according to a result of the evaluation in the step (d) to configure a next generation including the filtered portion of the chromosomes and new chromosomes; and
   repeatedly performing the steps (b) to (d).

5. The method of claim 4, wherein the radio map construction method includes:
   terminating a repetitive performance of the steps (b) to (d) through generation evolution when no more gain exists as a result of the evaluation using the loss function as compared with a previous generation.

6. The method of claim 1, wherein the first temporary radio map is generated through a process of generating a fingerprint corresponding to each location in the building using sets of the pairs and through an interpolation technique.

7. The method of claim 1, before the step (a), further comprising:
   collecting fingerprints corresponding to a specified address through a designated application; and
   classifying the address-labeled fingerprints via the collecting according to addresses,
   wherein the designated application is a payment application or a resource usage metering application.

8. The method of claim 7, further comprising:
   clustering the fingerprints collected in correspondence with the designated address into a plurality of groups and determining a fingerprint to be labeled with the address using the fingerprints of the clustered group.

9. The method of claim 7, further comprising:
   collecting a fingerprint sequence including fingerprints and a series of collection times using the designated application before the step (a).

10. The method of claim 7, wherein the collecting of the fingerprints corresponding to the designated address includes
    correcting fingerprints including pairs of signal strengths and one or more wireless AP identifiers collected by the designated application for a predetermined time before, after, or before and after an occurrence time of a transaction through the designated application.

11. The method of claim 7, wherein the steps (a) to (d) are performed on fingerprints of addresses classified as a commercial area.

12. The method of claim 11, wherein when an address of the classified addresses is a residential area, a radio map of the residential area is further constructed through an interpolation technique for fingerprints corresponding to the address of the residential area.

* * * * *